United States Patent [19]

Payrhammer et al.

[11] 4,033,693

[45] July 5, 1977

[54] LIGHT INTERRUPTER

[75] Inventors: Bernd Payrhammer, Munich; Siegfried Bartel, Gauting; Geert Besigk, Munich, all of Germany

[73] Assignee: AGFA-Gevaert, Aktiengesellschaft, Leverkusen, Germany

[22] Filed: Jan. 21, 1975

[21] Appl. No.: 542,771

[30] Foreign Application Priority Data

Jan. 24, 1974 Germany .......................... 2403315

[52] U.S. Cl. ................................. 355/71; 350/269; 354/234; 354/236; 354/261

[51] Int. Cl.² ..................... G03B 27/76; G03B 9/20

[58] Field of Search .................... 355/71, 32, 36; 354/234, 236, 250, 254, 261; 350/269, 273, 266; 352/208

[56] References Cited

UNITED STATES PATENTS

| | | | |
|---|---|---|---|
| 2,390,216 | 12/1945 | Guedon | 354/234 |
| 2,702,500 | 2/1955 | DeBell | 354/234 |
| 3,088,388 | 5/1963 | Tredopp | 354/234 X |
| 3,272,106 | 9/1966 | Czekalla | 354/234 |
| 3,281,592 | 10/1966 | Dixon | 354/250 X |
| 3,654,845 | 4/1972 | Fahlenberg et al. | 354/261 X |
| 3,687,042 | 8/1972 | Mizui et al. | 354/234 |

*Primary Examiner*—Richard A. Wintercorn
*Attorney, Agent, or Firm*—Michael J. Striker

[57] ABSTRACT

An optical apparatus in which a beam of light is caused to travel along a predetermined direction is provided with a light interrupter for interrupting the beam. The light interrupter includes a light-interrupting component, such as a shutter blade or color filter, and a driving coil connected to the light-interrupting component. The light-interrupting component and driving coil are mounted for pivotal movement about an axis substantially parallel to the beam direction, with the light-interrupting component moving between a light blocking position and an unblocking position. A control circuit is connected to the driving coil for effecting energization of the coil. A magnet arrangement is so positioned as to establish a magnetic field through which the driving coil moves when the driving coil pivots around the pivot axis, with the magnetic field being oriented substantially perpendicular to the direction of movement of the driving coil.

18 Claims, 7 Drawing Figures

LIGHT INTERRUPTER

BACKGROUND OF THE INVENTION

The invention relates to the use of beam interrupters in photographic and other optical equipment, such as copying devices and the like.

More particularly, the invention relates to beam interrupters of the type, for example, wherein use is made of shutter blades or color filter paddles which are moved by electromagnetic means about a pivot axis oriented generally parallel to the direction of the light beam, into and out of the path of the light beam.

Light interrupters are already known in which there are mounted on a plate a plurality of rotary electromagnet devices arranged adjacent to an opening for the light beam. Each of the rotary electromagnet devices is operative for moving a respective one of a plurality of light interrupting components, for example filters, into the path of the light beam. Such rotary electromagnet devices, when used to so move light-interrupting components, are disadvantageous; they have a relatively large mass which must be accelerated, and they give rise to relatively great frictional energy losses resulting from the conversion of linear motion into rotary motion by means of a crank device. Such motion-imparting devices are accordingly not well suited for light interrupters, when the light-interrupting components must be moved with a very high speed into the path of the light beam of, for example, a copying device.

Modern color copying devices employ copying times for individual negatives on the order of magnitude of a few tenths of a second. The time available for introducing a filter into the path of the light beam of the copying device is on the order of a few hundreths of a second. The aformentioned rotary electromagenet devices are not suitable for use in the light interrupter of such a copying device. In addition, they do not permit a controlled return motion of the light-interrupting components.

SUMMARY OF THE INVENTION

It is an object of the present invention to provide a light interrupter arrangement of the general type in question, but of such design as to meet the requirements of modern high-production printers, and the like, especially with respect to speed of operation.

This object, and others which will become understandable from the description, below, of preferred embodiments, can be met, according to one advantageous concept of the invention, by providing a light interrupter comprised of one or more light-interrupting components, such as shutter blades or filter paddles, moved into or out of the path of the light beam by means of a drive coil mounted for movement through a magnetic field which is oriented transverse or perpendicular to the direction of motion of the drive coil.

Advantageously, the one or more light-interrupting components, such as shutter blades or filter paddles, are mounted for pivoting movement about an axis oriented parallel to the general direction of the light beam.

According to a further advantageous concept of the invention, the light-interrupting component proper is connected sustantially directly to the drive coil. This direct connection results in a minimal loss of energy during accleration, because energy is not lost during transmission through an intermediate linkage, or the like.

According to the invention, the mass of the moving parts can be kept as low as conceivable; the moving part of the electromagnetic motion-imparting device of the light interrupter can consist substantially exclusively of the drive coil. Some kind of mounting means for pivotally or otherwise mounting the actual light-interrupting component is anyway necessary and, by virtue of the preferred direct connection between the drive coil and the light-interrupting component, this mounting means will simultaneously serve to mount the drive coil for movement, according to one advantageous concept of the invention.

With a light interrupter having most or all of the aforementioned characteristics, the requisite motions can in fact be completely and reliably performed within the very short times allotted for such motions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
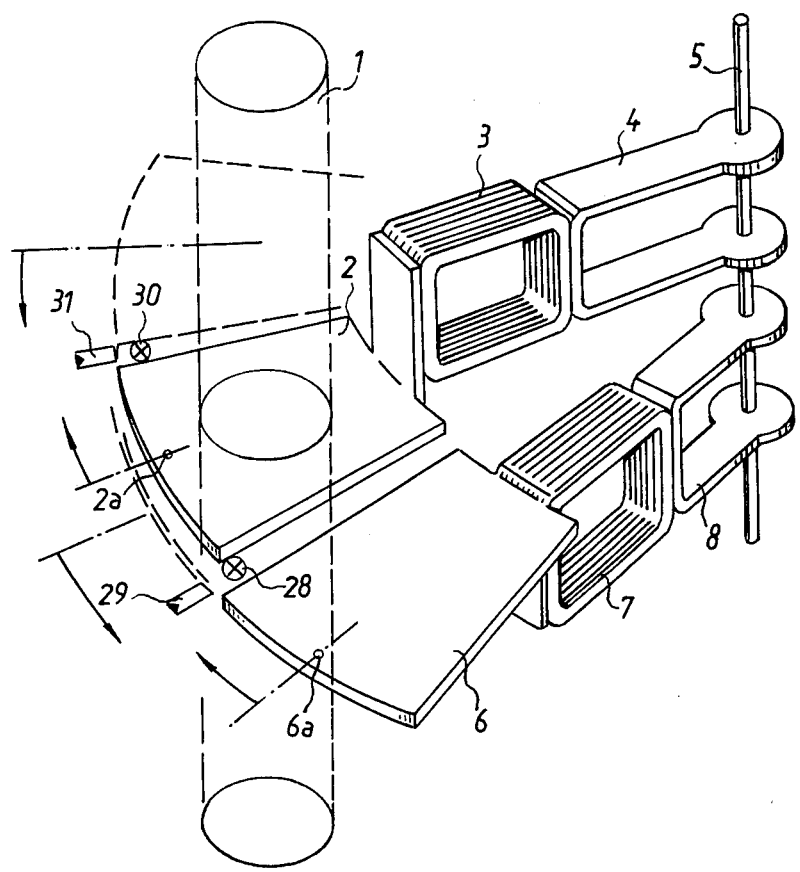
FIG. 1 is a perspective view of a light interrupter comprised of two light-interrupting components mounted on a common pivot axle.

In FIG. 1, reference numeral 1 designates the light beam which is to be blocked and unblocked by the light interrupter. In this illustration, the light beam is of approximately circular cross-section and cylindrical. However, the light beam could instead be conically divergent or convergent. However, in the illustrated situation, it is of significance that the light beam is of generally circular cylindrical shape in the plane in which the interruption occurs, because such shape can give rise to various difficulties, discussed above, which, however, can be avoided with the illustrated construction. The light source itself, the original to be copied, the photographic copying material on which the copy is to be formed, and the surrounding details of the copying device are not per se novel, and accordingly are not illustrated, for the sake of simplicity. However, it is to be understood that the inventive light interrupters are intended for use in photographic copiers and printers, as well as other photographic and optical equipment in which a light beam or the like is to be blocked and unblocked.

The light beam 1 is blocked by means of a shutter blade 2. This blade 2 is secured at one side to a cantilevered driving coil 3. The coil 3 has a generally rectangular configuration and is stiffened by means of synthetic plastic resin material. The driving coil 3 in turn is secured, by means of a U-shaped bracket 4, to a pivot shaft extending in direction parellel to the general direction of the light beam 1. In FIG. 1 the manner in which current is supplied to the driving coil 3 and the magnet system which cooperates to cause the driving coil 3 to move are not shown, for the sake of clarity; however, these features are illustrated in FIGS. 2-4, discussed below.

Figure 2:
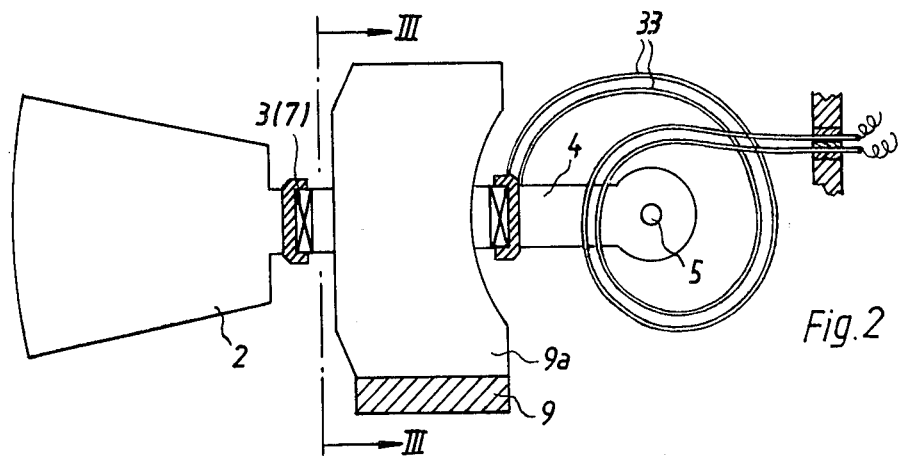
FIG. 2 is a view of the arrangement of FIG. 1, looking in the direction of the pivot axis, and sectioned along line II—II of FIG. 3.

The supply of current to the driving coil 3 can be effected as shown in FIG. 2, for example, by means of insulated copper wires 33 leading tangentially out of the coil 3 and extending once around the pivot shaft 3 at a considerable distance from shaft 3. The angular extent to which these current supply wires are bent during the movement of the light-blocking component—i.e., the shutter blade 2—is relatively small, so that there exists no breakage danger for these current supply wires, so long as the flexibility of these wires is chosen large enough.

In FIG. 1, there is depicted below the shutter blade 2, arranged outside the path of the light beam 1, a second shutter blade 6. Shutter blade 6 is connected to a driving coil 7 corresponding to driving coil 3, and driving coil 7 is mounted for pivotal movement about the pivot shaft 5 by means of a respective U-shaped bracket 8. The two shutter blades 2 and 6 are movable independently of each other.

Figure 3:
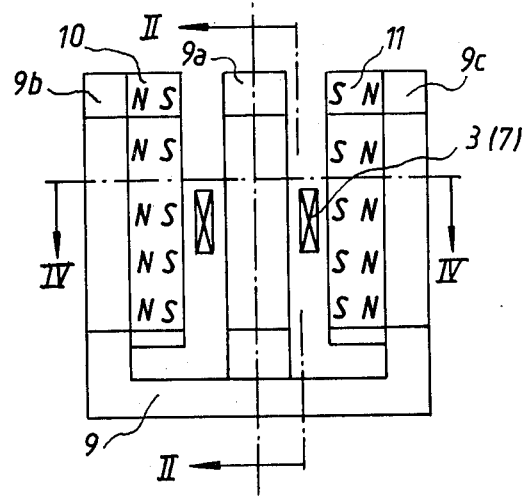
FIG. 3 is a section taken along line III—III of FIG. 2.
Figure 4:
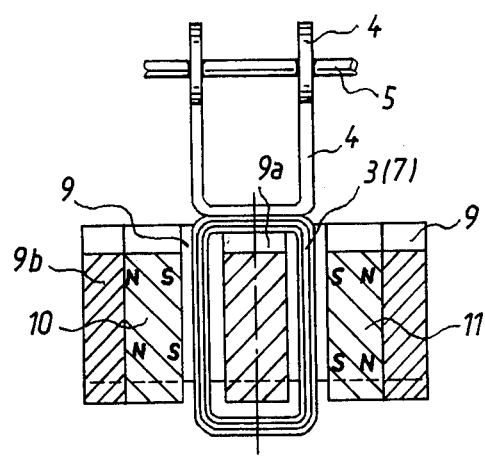
FIG. 4 is a section taken along line IV—IV of FIG. 2.

FIGS. 2-4 depict details of the magnet arrangement which surrounds and cooperates with the driving coil 3 or 7. As can be seen particularly clearly in FIG. 3, the magnet arrangement has the general form of an "E." The middle leg 9a of the "E" projects into the opening in the driving coil 3 or 7, whereas the outer legs 9b, 9c, parallel to the middle leg 9a, enclose the path of movement of the pivotally mounted driving coil.

The essentially E-shaped portion 9 of the magnet arrangement consist of a highly permeable magnetic material, e.g., soft iron. In contrast, the essentially rectilinear members 10, secured to the facing inner sides of the outer legs 9b, 9c, consist of a magnetic material of high coercivity. The two magnetic members 10, 11 are magnetically polarized in the horizontal direction, as viewed in FIG. 3. The sides of members 10, 11 which face towards each other are south poles, whereas the sides which face away from each other are north poles; the polarities could of course be just the opposite.

In this way, in the relatively narrow space available for the guidance of the driving coil 3 or 7, between the magnetized members 10, 11, on the one hand and the middle leg 9a, on the other hand, there will exist a substantially homogeneous magnetic field oriented generally perpendicular to the two guide slots in which the two long sides of the driving coil 3 or 7 move. Accordingly, if current is supplied to the driving coil 3 or 7, then, in accordance with the right-hand rule, an electromagnetic force will be exerted upon driving coil 3 or 7, the force being exerted in the general direction of the elongation of the middle leg 9a. This force will be transmitted substantially directly to the respective shutter blade 2 or 6.

As can be seen from FIG. 2, the E-shaped magnetic core 9 is closed at only one side, and the middle leg 9a therof curves around the pivot axis 5 approximately concentric thereto, so that the magnetic field relationships along the path of motion of the driving coil 3 or 7 will be approximately uniform. If desired, the open side of the soft-iron magnetic core 9 can be closed off also, for example by means of a screwed-on transverse leg.

The operation of the illustrated arrangement is as follows:

Attention is directed to FIG. 1. In the starting condition, prior to the commencement of the copying operation, the shutter blade 2 is in the illustrated solid-line position, blocking the path of the light beam 1. When the illumination or exposure is to begin, the driving coil 3 is supplied with energizing current, in cooperation with the aforedescribed permanent magnet arrangement. As a result, an electromechanical force is exerted directly upon the driving coil and accordingly upon the shutter blade 2. The shutter blade 2 pivots in clockwise direction about the pivot axle 5, and moves out of the path of the light beam 1.

The boundary edge of the unblocking portion of the shutter blade 2—i.e., the boundary edge which passes through the light beam as the shutter blade 2 moves out of the path of the light—is exactly linear and extends exactly radially, relative to the pivot axle 5, and will evidently continue to extend radially all during its passage through the light beam 1. Understandably, the illumination or exposure of the (non-illustrated) original starts as soon as a small portion of the total light beam begins to be unblocked, and of course continues as an increasingly greater portion, and finally the whole light beam, becomes unblocked.

Now if, for example, by means of a photoelectric automatic exposure control device of conventional type, there is generated a signal commanding that the light beam be again blocked, then energizing current is supplied to the second driving coil 7, associated with the shutter blade 6. This flow of current in coil 7 will be in the same direction as that previously in the coil 3, assuming the two driving coils are similarly wound. Accordingly, the driving coil 7 and the associated shutter blade 6 will move from the solid-line position of FIG. 1 in the same direction as shutter blade 2 just moved, i.e., clockwise, pivoting about the axle 5, progressively blocking an increasing portion of the light beam 1, until the entire light beam 1 is blocked. The reblocking movement performed by the shutter blade 6 is substantially identical to the unblocking movement previously performed by the shutter blade 2, with regard to the variation of the instantaneous speed of movement from the commencement to the termination of movement. As a result of such virtual identity of the movements performed by the unblocking and reblocking shutter blades, each cross-sectional component of the light beam 1 is unblocked, and thereby participates in the exposure or illumination operation, for the same length of time as each other such cross-sectional component of the light beam.

The just-described successive movements of first the unblocking shutter blade 2 and then the reblocking shutter blade 6 make it possible to position the light interrupter arrangement with considerable freedom relative to the path travelled by the light beam 1, since whatever the position selected all cross-sectional components of the light beam will be unblocked for exactly the same length of time.

At the end of the exposure operation, the shutter blade 2 is in a position (indicated in broken lines in FIG. 1) not at all blocking the light beam 1, whereas the shutter blade 6 is in a position (indicated in broken lines in FIG. 1) completely blocking the light beam 1. It is now necessary, as one possibility, to cause the two shutter blades to return, one after the other, and in substantially identical movements, to their starting positions during a pause between successive exposure operations, for example during an exchange of originals to be copied.

However, as a very advantageous alternative possibility, the two shutter blades 2, 6 are not thusly returned to their starting positions. Instead, during the next-following exposure operation, first the shutter blade 6 and then the shutter blade 2 are caused to move in the opposite direction, i.e., caused to swing counterclockwise, back to the solid-line starting positions of FIG. 1. In this way, the shutter blade 6 now acts as the unblocking component and the shutter blade 2 acts as the reblocking component; i.e., the roles previously played by these two components are exchanged. This expedient reduces the number of movements performed by the shutter blades, because return movements performed intermediate successive exposure operations are eliminated.

In the arrangement depicted in FIGS. 1–4 each driving coil 3, 7 is provided with a separate respective E-shaped permanent magnet arrangement. However, the shutter arrangement can be so designed that the two driving coils 3, 7 share a common permanent magnet arrangement. Since the control of the acceleration of the shutter blades 2 and 6 is effected exclusively by controlling the flow of current in the associated one of the two driving coils 3, 7, the two driving coil systems do not influence each other. For this reasons, the two shutter blades can be caused to perform, one after the other, virtually identical movements, in the desired direction, even when the associated driving coils share a common permanent magnet system, without the need for special compensation expedients, or the like.

To control the flow of current in the driving coils in dependence upon the position of the respective shutter blades relative to the light beam 1, use can be made of a control arrangement such as taught in West German patent application P 22 46 543.6 and in the corresponding U.S. patent application Ser. No. 399,183, filed Sept. 20, 1973 by Volker Weinert and assigned to the assignee of the present application.

However, it would instead be sufficient to provide at the outer edge portion of each shutter blade 2, 6, in the middle of the blade, a small aperture 2a, 6a detectable by photoelectric position detectors 28, 29 and 30, 31, arranged at the edges of the blades 2. The photoelectric detectors trigger switchovers back and forth between a constant acceleration current (i.e., a linearly increasing velocity of the moving shutter blade) and a constant braking current, as a result of which approximately the very shortest times are required for the unblocking and reblocking movements.

Figure 7:
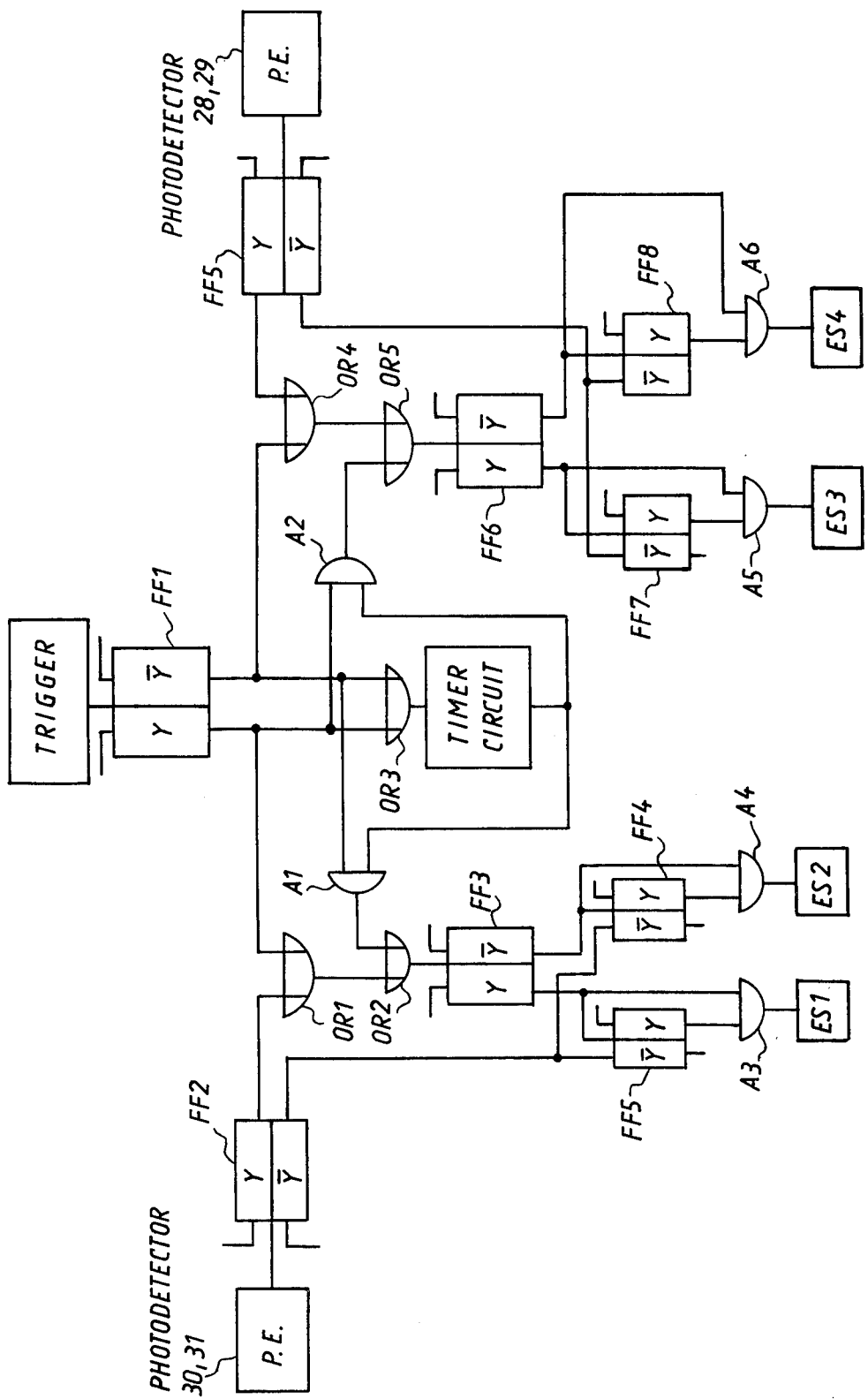
FIG. 7 depicts a control circuit for controlling the movements of the light-interrupting components of the light interrupter of FIGS. 1–4.

A control circuit for controlling the operation of the two-blade shutter arrangement of FIGS. 1–4 is schematically depicted in FIG. 7.

ES1, ES2, ES3, ES4 are controllable electronic switches.

When ES1 is conductive, a current path is closed connecting coil 3 to a positive current source.

When ES2 is conductive, a current path is closed connecting coil 3 to a negative current source.

When ES3 is conductive, a current path is closed connecting coil 7 to a positive current source.

When ES4 is conductive, a current path is closed connecting coil 7 to a negative current source.

FF1 to FF8 are conventional flip-flops having two complementary outputs, namely a Y output and a $\overline{Y}$ output, a set input associated with the Y output, a reset input associated with the $\overline{Y}$ output, and a so-called toggle or complementing input. All these eight flip-flops are dynamically triggered, i.e., the flip-flop is triggered only when the signal applied to one of the three flip-flop inputs changes from 0 level to 1 level. When the signal at the toggle input changes from 0 level to 1 level, the state of the flip-flop changes. When the signal at the set input of the flip-flop changes from 0 to 1 level, the state of the flip-flop changes from $\overline{Y}$ to Y, unless the fli-flop was already in the Y state. When the signal at the reset input of the flip-flop changes from 0 level to 1 level, the state of the flip-flop changes from Y to $\overline{Y}$, unless the flip-flop was already in the $\overline{Y}$ state. The signals at the outputs of the flip-flops are of course persisting signals.

A1 to A6 are conventional AND-gates, and OR1 to OR5 are conventional OR-gates.

The TRIGGER stage merely generates a start signal which triggers the performance of an exposure operation.

The TIMER CIRCUIT automatically controls the duration of the expsoure operation, by automatically controlling the time interval between the energization of the coil associated with the unblocking shutter blade and the energization of the coil associated with the reblocking shutter blade. Details of the TIMER CIRCUIT are not disclosed, because such circuits are conventional per se. The TIMER CIRCUIT is essentially a monostable timing circuit having an unstable state whose duration is automatically changed in dependence upon photographic factors such as original density, exposure light brightness, and the like.

The shutter blade 2, as explained above, cooperates with a photoelectric detector 30, 31. The shutter blade 2 is movable between a blocking end position and an unblocking end position. When the shutter blade 2 reaches either one of its two end positions, the photoelectric detector 30, 31 generates a pulse. Likewise, when the aperature 2a moves past the photoelectric detector 30, 31, in either clockwise or counterclockwise direction, the photoelectric detector 30, 31 generates a pulse.

Similarly, the shutter blade 6, as explained above, cooperates with the photoelectric detector 28, 29. The shutter blade 6 is movable between a blocking end position and an unblocking end position. When the shutter blade 6 reaches either one of its two end positions, the photoelectric detector 28, 29 generates a pulse. Likewise, when the aperture 6a moves past the photoelectric detector 28, 29, in either clockwise or counterclockwise direction, the photoelectric detector 28, 29 generates a pulse.

The operation of the circuit shown in FIG. 7, in conjunction with the light interrupter shown in FIGS. 1–4, is as follows:

Initially, all eight flip-flops F1 to F8 are in the $\overline{Y}$ state; i.e., at each Y output there is a 0 signal, and at each $\overline{Y}$ output there is a 1 signal.

A start signal is applied to the TRIGGER. The TRIGGER causes FF1 to change from the $\overline{Y}$ state to the Y state.

The signal level at the Y output of FF1 accordingly changes from 0 to 1. This level change is applied via OR1 and OR2 to the toggle input of FF3. As a result, FF3 changes from the $\overline{Y}$ state to the Y state.

The signal level at the Y output of FF3 accordingly changes from 0 to 1. This level change is applied to the toggle input of FF5. As a result, FF5 changes from the $\overline{Y}$ state to the Y state. 1 signals are now applied to both inputs of AND-gate A3, and accordingly controllable electronic switch ES1 is conductive. Positive current flows through the driving coil 3, and the shutter blade 2 of FIG. 1 moves clockwise, from the solid-line blocking position towards the broken-line unblocking position.

As the shutter blade 2 moves clockwise, the aperture 2a moves past the photoelectric detector 30, 31, and the latter generates a pulse which is applied to the toggle input of FF2, causing FF2 to change from the $\overline{Y}$ state to the Y state.

Accordingly, the signal at the Y output of FF2 changes from 0 to 1, and this signal change is applied via OR1 and OR2 to the toggle input of FF3. As a result, FF3 changes from the Y state back to the $\overline{Y}$ state. The signal at the Y output of FF3 is now a 0 signal, and this 0 signal is applied to one input of AND-gate A3. Consequently, a 0 signal appears at the output of A3, and controllable electronic switch ES1 becomes non-conductive. As a result, the coil 3 is no longer connected to the positive current source, and clockwise acceleration of shutter blade 2 stops.

During the just-mentioned change of FF3 from the Y state back to the $\overline{Y}$ state, the signal at the $\overline{Y}$ output of FF3 changes from 0 to 1, and this signal change is applied to the toggle input of FF4. As a result, FF4 changes from the $\overline{Y}$ state to the Y state. Since now a 1 signal is present at both inputs of AND-gate A4, there appears a 1 signal at the output of A4, and controllable electronic switch ES2 becomes conductive, thereby connecting coil 3 to the negative current path, which supplies braking current for the driving coil 3.

When the shutter blade 2 has moved clockwise all the way past the photoelectric detector 30, 31, the photoelectric detector 30, 31 generates another pulse, which is applied to the toggle input of FF2. As a result, FF2 changes from the Y state back to the $\overline{Y}$ state. The signal at the $\overline{Y}$ output of FF2 changes from 0 to 1, and this signal change is applied to the reset inputs of FF4 and FF5. As a result, FF4 and FF5 both change from the Y state to the $\overline{Y}$ state. Consequently, the signal at the left input of A4 is now a 0 signal, and electronic switch ES2 becomes non-conductive. Accordingly, the flow of braking current through driving coil 3 stops.

It will be recalled that the above-described series of circuit changes was initiated when the signal at the Y output of FF1 changed from 0 to 1. This same signal change was also applied via OR3 to the input of the TIMER CIRCUIT. Upon elapse of an automatically selected time interval, a 1 signal appears at the output of the TIMER CIRCUIT. Accordingly, after elapse of the just-mentioned time interval, 1 signals are present at both inputs of A2, and a 1 signal appears at the output of A2. This last-mentioned 0 to 1 signal transition is applied via OR5 to the toggle input of FF6.

As a result, the shutter blade 6 moves from the solid-line unblocking position of FIG. 1 to the broken-line blocking position, braking of the shutter blade 6 commencing when the aperture 6a passes the associated photoelectric detector 28, 29. The operation of the right half of the circuit, associated with the shutter blade 6, is identical to what has just been described with respect to the shutter blade 2 and the associated left half of the circuit.

When the shutter blade 6 has reached the broken-line blocking position of FIG. 1, the exposure operation has been completed.

For the next-following exposure operation, a signal is again applied to the TRIGGER, for example in synchronism with the passage of originals through the exposure station, or the like. This second start signal causes FF1 to change from the Y state to the $\overline{Y}$ state.

As a result, the shutter blade 6 moves from the broken-line blocking position of FIG. 1 back to the solid-line unblocking position of FIG. 1. The operation of the right half of the circuitry of FIG. 7 is identical to the operation of the left half of the circuitry for the previous exposure operation.

After elapse of the automatically selected time interval, the TIMER CIRCUIT applies a 1 signal to the lower input of A1. Since FF1 is already in state $\overline{Y}$, a 1 signal appears at the output A1 and is applied via OR2 to the toggle input of FF3. As a result, the shutter blade 2 is moved from the broken-line unblocking position of FIG. 1 back to the solid-line blocking position. The operation of the left half of the FIG. 7 circuit during this second exposure operation is identical to the operation of the right half of the FIG. 7 circuit during the preceding or first exposure operation.

In this way, the roles of the shutter blades 2 and 6 are reversed after each exposure operation has been completed. When FF1 is in the Y state, blade 2 serves as the unblocking blade, and blade 6 serves as the reblocking blade; when FF1 is in the $\overline{Y}$ state, blade 6 serves as the unblocking blade, and blade 2 serves as the reblocking blade.

Figure 5:
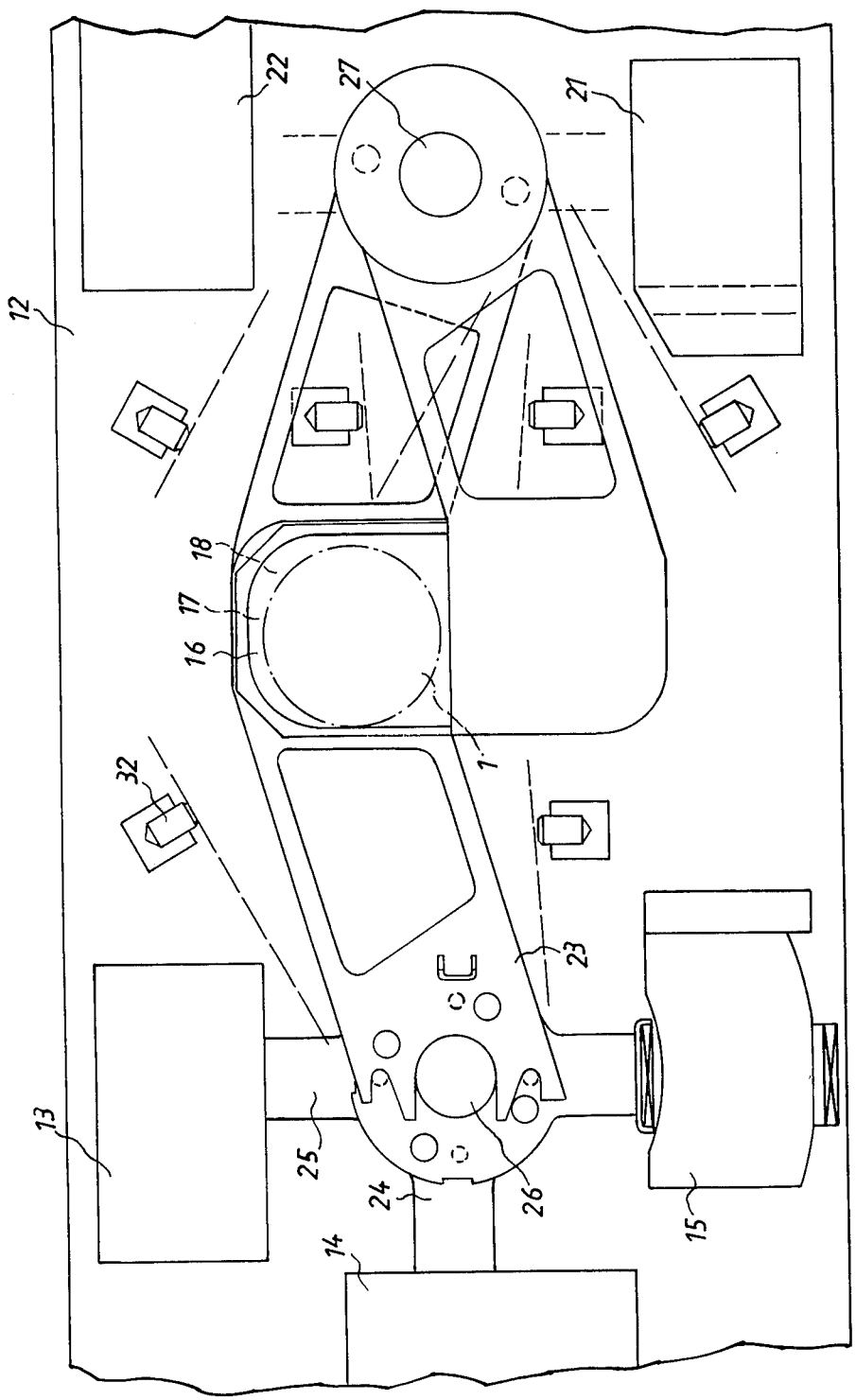
FIG. 5 depicts a different exemplary light interrupter, seen from above.
Figure 6:
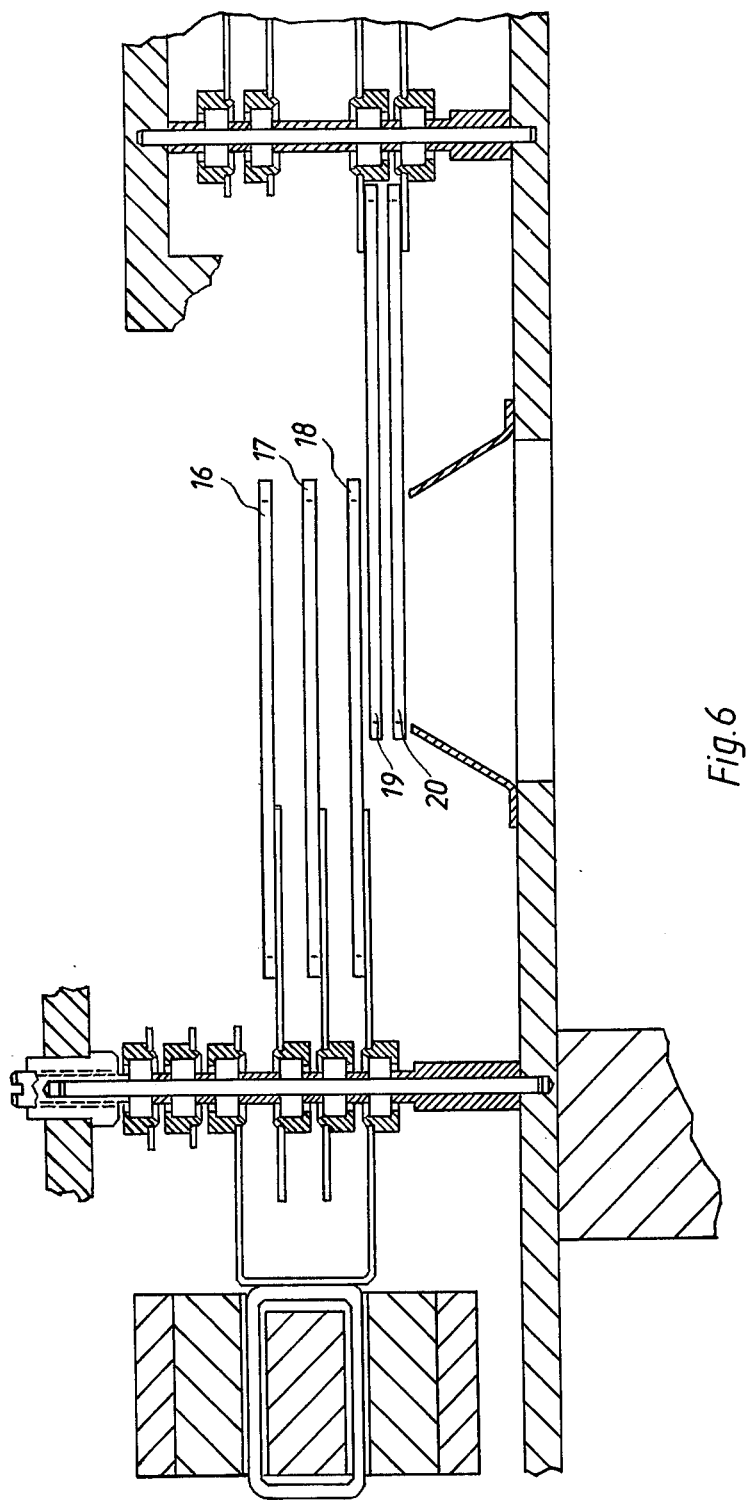
FIG. 6 depicts the light interrupter of FIG. 5, seen from the side.

FIGS. 5 and 6 depict a second light interrupter arrangement according to the invention. The light interrupter arrangement of FIGS. 5 and 6 incorporates not only two shutter blades 19, 20 but also three color filters 16, 17, 18, each of these five light-interrupting components swinging into and out of the path of the light beam at the appropriate times.

In particular, the arrangement includes a base 12 on which are mounted three electromagnetic moving means 13, 14, 15 for moving respective color filters 16, 17, 18 into and out of the path of the light beam 1, as well as two electromagnetic moving means 21, 22 for moving the respective shutter blades 19, 20 into and out of the path of the light beam 1.

Each of the color filters 16, 17, 18 is arranged on a respective bent lever 23, 24, 25, all independently pivotable about a common pivot axle 26. The two shutter blades 19, 20 are independently pivotable about a common pivot axle 27. The electromagnetic moving means 13, 14, 15, 21, 22 correspond in their construction to the moving means shown in FIGS. 2–4 and described above, and accordingly need not be described in detail again with respect to FIGS. 5 and 6. Abutments 32 are provided to create definite end positions for respective ones of the bent levers 23, 24, 25.

An important difference between the light interrupter of FIGS. 5 and 6 and that of FIG. 1 resides in the fact that the color filters are arranged on angled levers 23, 24, 25 each of which is comprised of one leg which carries the driving coil of the respective magnet system and each of which is comprised of another leg which carries the respective color filter. The angle between the two legs of the angled lever is different for each of the three levers, in order to hold the respective filters in the blocking or unblocking position, as the case may be. In this way, it is possible to mount on a single base plate all five electromagnetic moving means, without these moving means or the levers moved thereby in any way interfering with each other. Additionally, the height of the arrangement, considered in the direction parallel to the light beam, can be kept relatively small. The means for energizing the driving coils of the moving means and for controlling the flow of the energizing current to effect the desired motions can be the same as used in connection with the light interrupter of FIG. 1. If desired, and in order to reduce the weight of the moving parts, the angled levers can be provided with sizable cut-outs at those portions of the levers where the presence of material is not necessary to contribute to the rigidity of the lever.

It will be understood that each of the elements described above, or two or more together, may also find a useful application in other types of constructions differing from the types described above.

While the invention has been illustrated and described as embodied in a light interrupter comprised of one or more shutter blades and for color filters, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an optical apparatus, particularly a photographic printer, copier, or the like, of the type in which a beam of light is caused to travel along a predetermined path in a predetermined direction, a light interrupter comprising, in combination, a light-interrupting component; a driving coil connected to said light-interrupting component; mounting means mounting said light-interrupting component and said driving coil for pivotal movement about an axis substantially parallel to the beam direction, with said light-interrupting component moving between a light blocking position and an unblocking position; a control circuit connected to said driving coil for effecting energization of said coil; and magnet means arranged to establish a magnetic field through which said driving coil moves when said driving coil pivots about said axis, with said magnetic field being oriented substantially perpendicular to the direction of movement of said driving coil.

2. In an apparatus as defined in claim 1, wherein said light-interrupting component has at least one light-interrupting edge which is straight and which intersects said axis.

3. In an apparatus as defined in claim 1, said light-interrupting component and said driving coil constituting a first light-interrupting component and a first driving coil, and said light interrupter additionally including a second light-interrupting component and a second driving coil connected to said second component, said mounting means mounting said second component and said second coil for pivotal movement about said axis, said control circuit including means for effecting energization of said second driving coil, and said magnet means establishing a magnetic field through which said second driving coil moves when pivoting about said axis and which is oriented substantially perpendicular to the direction of movement of said second driving coil.

4. In an apparatus as defined in claim 3, wherein each of said light-interrupting components has at least one light-interrupting edge which is straight and which intersects said axis.

5. In an apparatus as defined in claim 1, wherein said light-interrupting component and said driving coil are mounted on different legs of an angled lever mounted by said mounting means for pivotal movement about said axis.

6. In an apparatus as defined in claim 2, wherein said first component and said first coil are mounted on different arms of a first angled two-armed lever, and wherein said second component and said second coil are mounted on different arms of a second angled two-armed lever, and wherein both said levers are mounted by said mounting means for pivotal movement about said axis, and wherein the angle formed by the two arms of said first lever is different from the angle formed by the two arms of said second lever, and wherein said angles and the lengths of said arms are such that when said first and second light-interrupting components are substantially superimposed in the light blocking position said first and second driving coils are angularly offset from each other relative to said axis, and wherein said magnet means includes first and second magnet means angularly offset from each other relative to said axis and arranged to establish respective first and second magnetic fields through which said first and second coils respectively move when pivoting about said axis, with said first and second magnetic fields each being oriented substantially perpendicular to the direction of movement of the respective coil.

7. In an apparatus as defined in claim 1, wherein said light interrupter further includes current supply wires connected to said driving coil, said current supply wires emerging from said driving coil in direction generally tangential to the direction of pivoting movement of said driving coil, said current supply wires being so arranged as to pass at least once about said axis.

8. In an apparatus as defined in claim 7, wherein said mounting means comprises a bracket pivotally mounting said driving coil around a pivot axle coincident with said pivot axis.

9. In an apparatus as defined in claim 8, wherein said bracket is a U-shaped bracket having two legs the ends of which are pivotally connected to said pivot axle and the connecting portion of which is connected to said driving coil.

10. In an apparatus as defined in claim 9, wherein said driving coil is generally rectangular.

11. In an apparatus as defined in claim 1, wherein said light-interrupting component has an angular extent considered relative to said axis, and wherein the range of pivotal movement of said component extends past the blocking position of said component by an angular distance relative to said axis at least as great as said angular extent.

12. In an apparatus as defined in claim 1, wherein said control circuit includes means for reversing the direction of current flow in said driving coil to cause said light-interrupting component to perform a back and forth pivotal movement.

13. In an apparatus as defined in claim 3, wherein said control circuit comprises means operative for so energizing said first and second driving coils as to cause said first light-interrupting component to pivot from the blocking position to the unblocking position so as to serve as a light unblocking component and as to cause said second light-interrupting component to pivot in the same direction as said first component from the unblocking position to the blocking position so as to serve as a light reblocking component.

14. In an apparatus as defined in claim 1, wherein said control circuit includes a position detector operative for detecting when said light-interrupting component is in a position intermediate the blocking and unblocking positions thereof and means operative for controlling the flow of current in aid driving coil in dependence upon the detected position.

15. In an apparatus as defined in claim 3, wherein said control circuit includes position detectors respectively operative for detecting when respective ones of said light-interrupting components are in positions intermediate the respective blocking and unblocking positions thereof and means operative for controlling the flow of current in said driving coils in dependence upon the detected positions.

16. In an apparatus as defined in claim 1, wherein said magnet means comprises an E-shaped soft iron body having a middle leg, with said driving coil closely surrounding said middle leg and being mounted for movement along the length of said middle leg, said E-shaped body having two outer legs having facing inner sides, and wherein said magnet means further includes two permanent magnet members of high coercive force each mounted on one of said facing inner sides.

17. In an apparatus as defined in claim 16, wherein said middle leg is curved so as to extend generally concentric to said axis.

18. In an apparatus as defined in claim 3, wherein said control circuit comprises means operative when first activated for so energizing said first and second driving coils as to cause said first light-interrupting component to pivot from the blocking position to the unblocking position so as to serve as a light unblocking component and to cause said second light-interrupting component to pivot in the same direction as said first component from the unblocking position to the blocking position so as to serve as a light reblocking component, but operative when next activated for causing the first and second light-interrupting components to reverse roles by so energizing said first and second driving coils as to cause said second light-interrupting component to pivot from the blocking position to the unblocking position so as to serve as a light unblocking component and as to cause said first light-interrupting component to pivot in the same direction as said second component from the unblocking position to the blocking position so as to serve as a light reblocking component.

* * * * *